United States Patent [19]

Kleeman

[11] Patent Number: 4,598,345

[45] Date of Patent: Jul. 1, 1986

[54] REMOTE CONTROLLED ILLUMINATION EQUIPMENT

[76] Inventor: Jeff Kleeman, 24555 Wayman St., Newhall, Calif. 91321

[21] Appl. No.: 741,947

[22] Filed: Jun. 6, 1985

[51] Int. Cl.⁴ .............................................. F21P 5/02
[52] U.S. Cl. .................................... 362/233; 362/272; 362/286; 362/321; 362/295; 340/825.72
[58] Field of Search ............... 362/269, 271, 272, 287, 362/383, 356, 286, 233; 318/16, 625; 340/825.72, 825.69; 315/292

[56] References Cited

U.S. PATENT DOCUMENTS

| | | | |
|---|---|---|---|
| 2,911,519 | 11/1959 | Phillips et al. | 362/272 |
| 3,971,028 | 7/1976 | Funk | 340/310 A |
| 4,091,328 | 5/1978 | Hellman et al. | 340/825.69 |
| 4,392,187 | 7/1983 | Bornhorst | 362/233 |
| 4,413,907 | 11/1983 | Lane | 318/16 |
| 4,419,721 | 12/1983 | Gregoire et al. | 362/269 |
| 4,538,973 | 9/1985 | Angott et al. | 340/825.72 |

Primary Examiner—William A. Cuchlinski, Jr.
Assistant Examiner—Diana M. Cox
Attorney, Agent, or Firm—Lawrence D. Weber

[57] ABSTRACT

A radio-controlled TV or movie studio spotlight or general purpose illumination instrument; two joy sticks, one for the pan or tilt, the other one for the dim or iris adjustments and settings, respectively, are installed on a panel of a 4-channel radio transmitter accessible for manual actuation to provide the respective commands for a four-channel radio receiver and thereby for the remote control of the lighting equipment functions.

7 Claims, 5 Drawing Figures

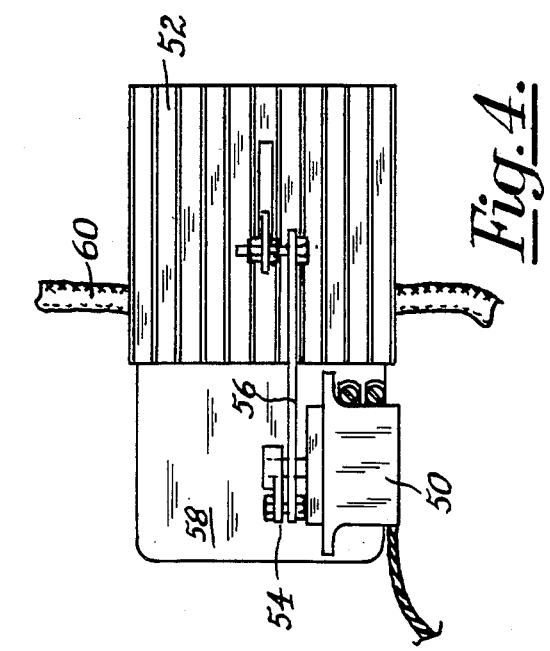
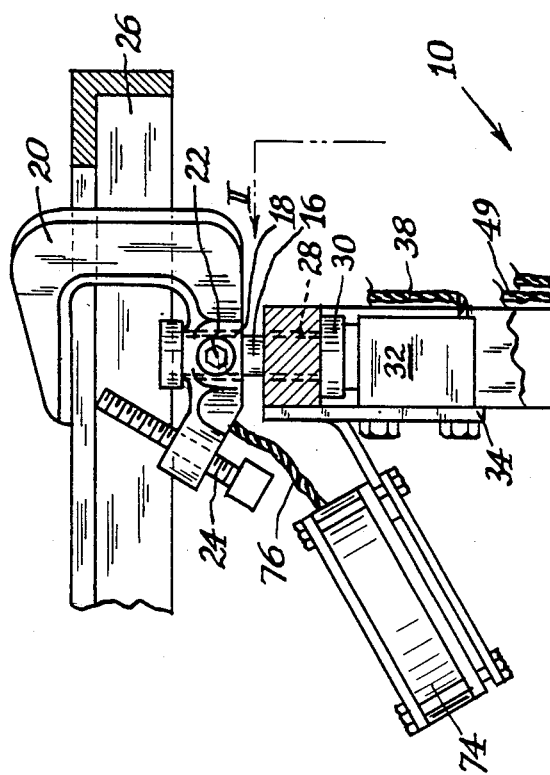
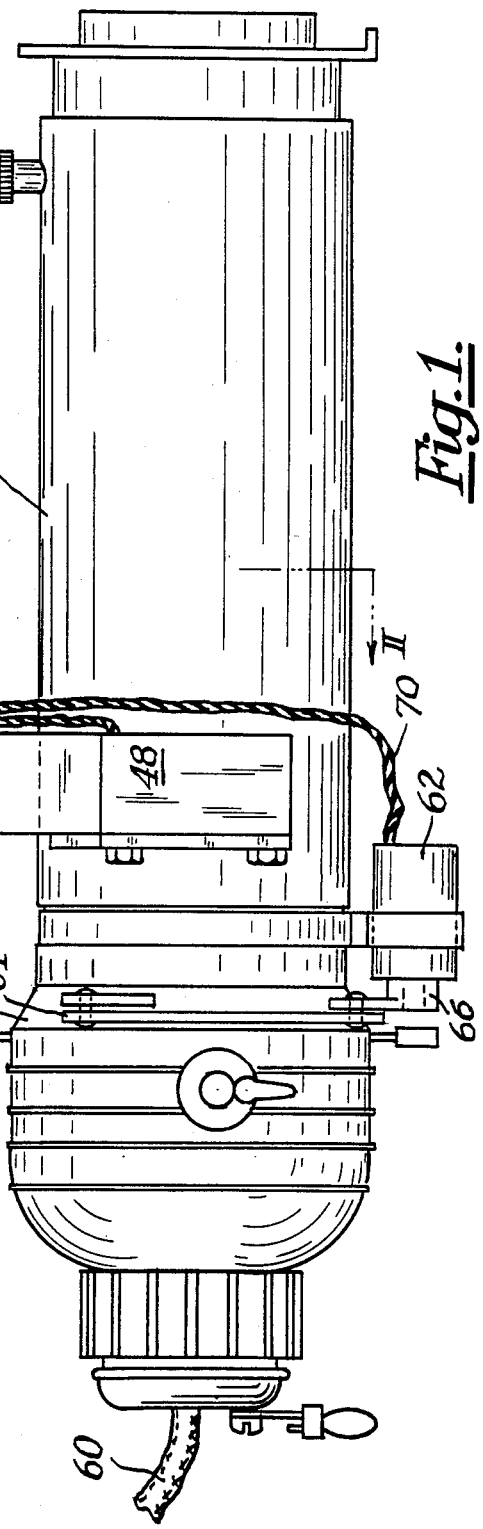
Fig. 4.
Fig. 1.

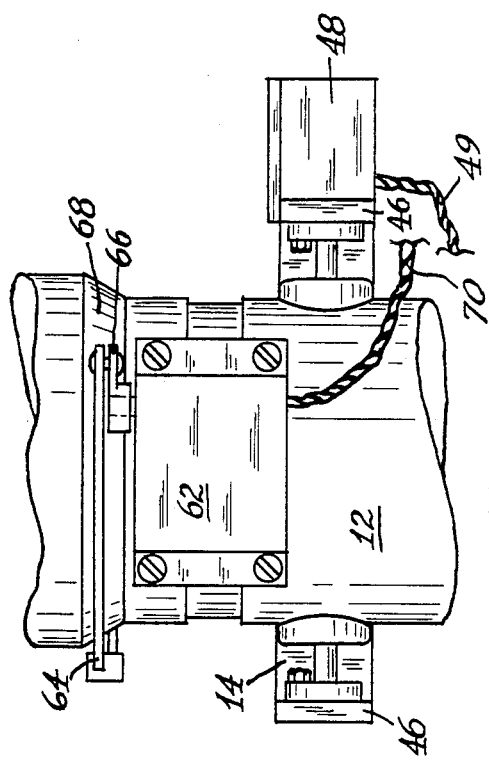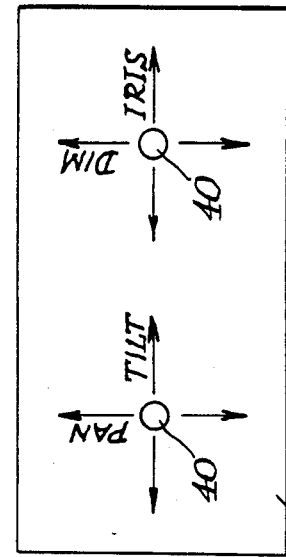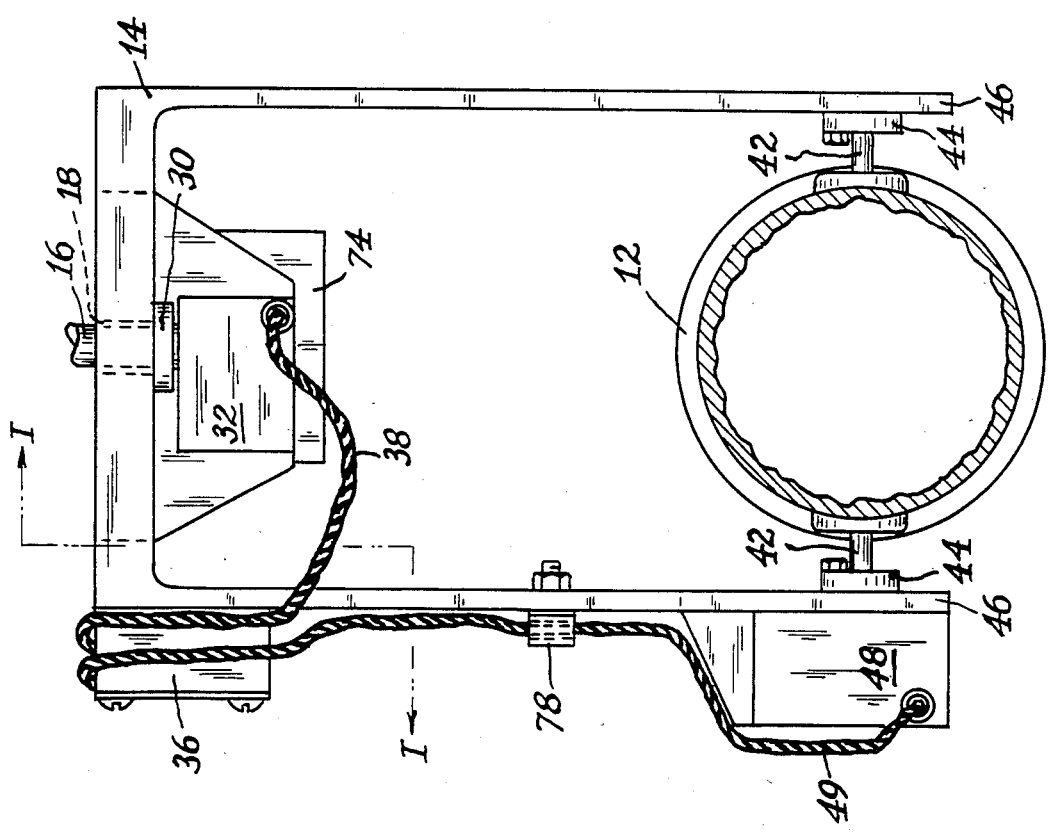

REMOTE CONTROLLED ILLUMINATION EQUIPMENT

BACKGROUND

Various teachings of prior art extend to lighting devices, their construction, their adjstments, their manual mechanical, electrical, hydraulic or combined actuation and to their end uses including, for example, commerical, stage, horticultural, motor-vehicles and street lighting applications, utilizing for their assemblies a multitude of basic structural members and elements which are also used as physical assembly parts with numerous implements of countless categories other than lighting equipment.

These teachings include, but may not be limited to, the following examples and references:

| Southwick | 972,480 | Oct 11, 1910 | N/A |
|---|---|---|---|
| Levy | 2,076,240 | April 6, 1937 | 240-3 |
| Snyder | 2,097,537 | Nov 2, 1937 | 240-3 |
| Wohlgemuth | 2,462,343 | Feb 2, 1949 | 250-2 |
| Fisher | 3,209,136 | Sept 28, 1965 | 240-3 |
| Funk | 3,971,028 | July 20, 1976 | 343/225 |

The foregoing selection of what is believed to be a listing of more typical than conclusive affinity objects includes presentations of elementary practices which unavoidably were also employed in this improvement, but they do not set forth, directly or by implication, the very substance of this application, namely, a wireless remote control by means of an operational radio frequency between a multi-channel radio transmitter and at least one radio receiver responding to the transmitted signals for the actuation of specific illumination equipment functions.

SUMMARY OF INVENTION

This invention extends to illumination equipment used, primarily but not exclusively, in television or movie studios. The operation of its panning and tilting function and that of its dimming and iris performance, respectively, is commanded by two, two-directional, double-throw joy sticks causing the transmission of signals from a, in this case, four-channel radio transmitter to a corresponding four-channel radio receiver, from which the respective, discrete commands are channeled to the particular function execution(s) by means of servomotors, also called servos.

The power for the entire aforedescribed configuration, including that for the lights themselves, is obtained from a single conventional electric wall outlet. For field operations, or where weight is no object, the required electric power can be supplied from batteries without affecting any of the foregoing factors.

Partly reiterating, the salient characteristics of this invention appear to be as follows, whereby the expression "instrument" is used for the entire lighting fixture and the term "lamp" for the electric bulb:

(a) Each movable instrument component part is directly driven through respective positive engagement with the driving element.

(b) The foregoing and other design considerations account for the instrument's extremely light weight.

(c) The instrument is capable of accommodating any focal length, 6-inch ellipsoidal reflector type spotlight without modification of the instrument.

(d) At least the preceding circumstance (c) assures a very cost-efficient instrument.

(e) The electric power required for the instrument, the lamp and for all auxiliary system services is customarily available from the connection with but one so-called convenience (wall-) outlet.

(f) The foregoing indicates both the instrument's field serviceability and its operational readiness wherever standard stage lights were heretofore mounted.

(g) The radio control of the system components provides the very optimum of versatility because of the absence of hard wiring among the various system parts. In addition thereto, that absence of cables increases the safety of system operation and that of the participating personnel.

(h) The radio-controlled system operation allows readily for its combination with digital-proportional transmitters and receivers.

(i) This instrument configuration allows for illumination operation at both great speed and efficiency, thereby permitting personnel to concentrate on higher-priority action items.

Further advantages of the subject improvement per se and over prior art will become more apparent from the following description and the accompanying drawing.

In the drawing, forming a part of this application:

FIG. 1 shows in side elevation and partly in cross-section in the plane I—I a simplified typical instrument assembly equipped in accordance with this invention;

FIG. 2 is a front elevation and partly in cross-section in the plane II—II of said simplified spotlight instrument assembly;

FIG. 3 is a bottom view of the spotlight supporting and movement means; FIG. 4 presents a top view of the dimmer resistor and its servomotor both mounted on a plate for installation to a support member and FIG. 5 is a schematic sketch of the radio transmitter and the control-joy stick arrangement in this case.

DETAILED DESCRIPTION

Referring now to the drawing, wherein like reference numerals designate like or corresponding parts and, more particularly, to FIG. 1, portraying an instrument 10, as used in the TV and movie industry, which is equipped with the elements of this improvement. A conventional spotlight 12 is mounted rotatably in the fork-shaped, downwardly open member 14 which is mounted, likewise rotatably on the vertical shaft 16 which is installed within a through-hole 18 formed in the bottom portion of a suitable C-clamp 20 and positioned therein fixedly through a set screw 22. In turn, said C-clamp 20 is equipped with a binding screw 24 for its fastening to, for example, an angle iron 26, or any other conveniently available structural member. Said shaft 16 extends downward through a hole 28 formed in the top of said fork-shaped member 14 and beyond through a bearing 30 to a mate with the drive shaft (not shown) of a first servo 32. The servo 32, mounted on a plate 34 which, in turn, is mounted to the top of the fork-shaped member 14, provides the rotational panning motion of the member 14 together with the spotlight 12 upon and during the reception of the respective radio signal by the, in this case, four-channel radio receiver 36 (FIG. 2), applying power to the servo 32 with the conductors 38. The rotation of this and of any other servos in this arrangement is reversible at any point of a cycle, subject to the command given by means of the respective joy stick 40 movement orientation, as illustrated in FIG. 5.

It should be noted that servomotors for all subject applications may be used whose shafts rotate at a speed reduced by a single-thread worm gear drive from the rotational armature speed. This feature imparts an inherent locking action on the driven members and reduces, if not precludes, any noticeable overrun or dead play upon the cessation of the electric power supply to the servo.

As illustrated in FIG. 2, the spotlight 12 is supported by a pair of trunnions 42 rotatable within the two trunnion bearings 44, each of the latter is mounted near the end of one of the two prongs 46 of the fork-shaped member 14. The end of one of the trunnions 42 is coupled to the shaft of a second servo 48 which controls selectively the upward and downward tilt of the spotlight 12. The servo 48, energized by the conductors 49, operates in the same fashion as the servo 32 and in the same response to radio signals given by, in this case, the joy stick 40 for the "tilt" command as indicated in FIG. 5.

It should be noted that all mechanical couplings with servomotor shafts may be equipped with commercially available friction clutches (not shown) which would allow for basic as well as corrective lamp-position adjustment and also for manual settings in the case of power failure.

A third servo 50, portrayed in FIG. 4, operates an, in this case, 1500-watt potentiometer dimmer 52 of, in this example, a sliding type, although rotary potentiometers may be used. The links 54 and 56 establish the mechanical connection between the servo 50 and the dimmer 52. Both the potentiometer 50 and the dimmer 52 are mounted on a base plate 58 which can be attached to structural members (not shown) or to the power cable 60 with one conductor of which the potentiometer 50 is electrically connected in a series circuit arrangement. Aside from the dimmer in the lamp's series circuit, the lamp power is, in this example, obtained without further control from a utility wall outlet.

A fourth servo 62 controls the iris opening of the spotlight 12 by means of the articulated links 64 and 66 connected with the iris ring 68, the latter being integral with the spotlight 12. The servo 62 receives its power through the conductor 70 from the radio receiver 36.

Various elements of the subject illumination equipment appear in more detail in FIG. 3, especially, the iris servo 62 and its linkage.

The servos are supplied with, for example, 6 volt d.c. power provided by the output of the four-channel radio receiver 36 (FIG. 2), upon the respective receipt of at least one of the four signals given from an, in this case, four-channel radio transmitter 72, equipped with two, two-directional, double-throw joy sticks 40. Both elements 72 and 40 are shown, symbolically, in FIG. 5.

It is noteworthy that other joy stick operating selections and circuits may offer more desirable and more versatile, combined effects which could be difficult to obtain, or only with considerable delays, if the lamp had to be adjusted manually, which, by the way, may be simply prohibitive under modern TV and movie production requirements.

Auxiliary devices, such as, for example, a cooling fan 74 may be installed on, say, the fork-shaped member 14 and supplied with its own, uncontrolled power through the cable 76.

With the exception of the, in this example, 1500-watt power cable 60, feeding the lamp bulb, and the fan cable 76, all other conductors, although serving applications varying from each other, carry d.c. power.

Conversely, the radio transmitter 72 may receive its input power from a utility-provided line, or from batteries, in which case its portability may present an added and advantageous feature to those outlined for the subject improvement.

Typical hardware items such as cable clamps 78 are shown at random locations.

It is understood that the herein shown and described embodiments of the subject invention are but illustrative and that variations, modifications and alterations are feasible within the frame of this invention.

I claim:

1. A remotely controlled illumination equipment having a rotatable and tiltable spotlight with variable opening and variable light output, structural members and electrical wiring, comprising:
   a radio-frequency receiver mounted on a said structural member of said illumination equipment, having a plurality of operating channels adapted to receive signals providing power source outputs,
   a plurality of servomotors each capable of operating a specific illumination equipment element, each said servomotor mounted in the proximity of the to be operated illumination equipment unit,
   a radio-frequency transmitter, positioned remotely from said radio-frequency receiver, having a plurality of operating channels compatible with those of said radio-frequency receiver,
   a plurality of multi-throw joy sticks connected with said radio-frequency transmitter,
   each said joy stick throw, when manually actuated, causing a specific command signal for transmission through a specific channel to the corresponding channel of said radio-frequency receiver, the availability of a specific power source output energizing a said servomotor for the duration of a said command signal transmission and thereby the execution of said command.

2. A remotely controlled illumination equipment as defined in claim 1, wherein
   a first servomotor operates the panning movement of the spotlight of said equipment.

3. A remotely controlled illumination equipment as defined in claim 1, wherein
   a second servomotor operates the tilting movement of the spotlight of said equipment.

4. A remotely controlled illumination equipment as defined in claim 1, wherein
   a third servomotor operates a spotlight-dimming potentiometer.

5. A remotely controlled illumination equipment as defined in claim 1, wherein
   a fourth servomotor adjusts the iris opening of the spotlight of the illumination equipment.

6. A remotely controlled illumination equipment as defined in claim 1, wherein
   the output speed of each servomotor shaft is reduced from the rotor speed by means of a single-thread worm and spur gear transmission imparting a self-locking feature on the movable members when the servo is de-energized.

7. A remotely controlled illumination equipment as defined in claim 1, wherein
   each mechanical coupling between a movable instrument member and a servomotor shaft is equipped with a friction clutch calibrated so as to allow for manual over-riding of a said element for adjustment correction and for manual movement in case of a power outage, respectively.

* * * * *